United States Patent [19]

Kyle

[11] Patent Number: 5,608,990
[45] Date of Patent: Mar. 11, 1997

[54] REMOVABLE LIGHT LIMITING BLIND ASSEMBLY

[75] Inventor: James H. Kyle, Keene, N.H.

[73] Assignee: Pompanette, Inc., Charlestown, N.H.

[21] Appl. No.: 524,545

[22] Filed: Sep. 7, 1995

[51] Int. Cl.⁶ ............................................. E06B 7/02
[52] U.S. Cl. ............................ 49/38; 49/62; 49/63
[58] Field of Search .................. 49/38, 63, 62, 49/64, 463, 41

[56] References Cited

U.S. PATENT DOCUMENTS

| | | |
|---|---|---|
| 14,798 | 5/1856 | Bruff . |
| 153,405 | 7/1874 | Van Horn et al. . |
| 314,393 | 3/1885 | Paradise . |
| 2,311,840 | 2/1943 | Land .............................. 49/63 X |
| 2,322,733 | 6/1943 | Steiner ........................... 49/38 X |
| 2,349,470 | 5/1944 | Stanfield ........................ 49/62 |
| 2,549,167 | 4/1951 | Brubaker . |
| 2,565,979 | 8/1951 | Michaelsen .................... 49/62 X |
| 5,405,184 | 4/1995 | Jardin et al. . |
| 5,507,547 | 4/1996 | Hattass et al. ................ 49/38 X |

*Primary Examiner*—Philip C. Kannan
*Attorney, Agent, or Firm*—David E. Dougherty

[57] ABSTRACT

A removable light controlling blind assembly for a marine vessel or the like includes two generally circular superimposed panels. Each of those panels has a plurality of translucent horizontal strips printed thereon and a plurality of alternating light transmitting strips separating the translucent strips. The two panels are movable in a linear direction to bring the strips into registration with one another. A flexible gasket is also provided and includes a groove for positioning the blind assembly in a port or hatch in the vessel.

6 Claims, 2 Drawing Sheets

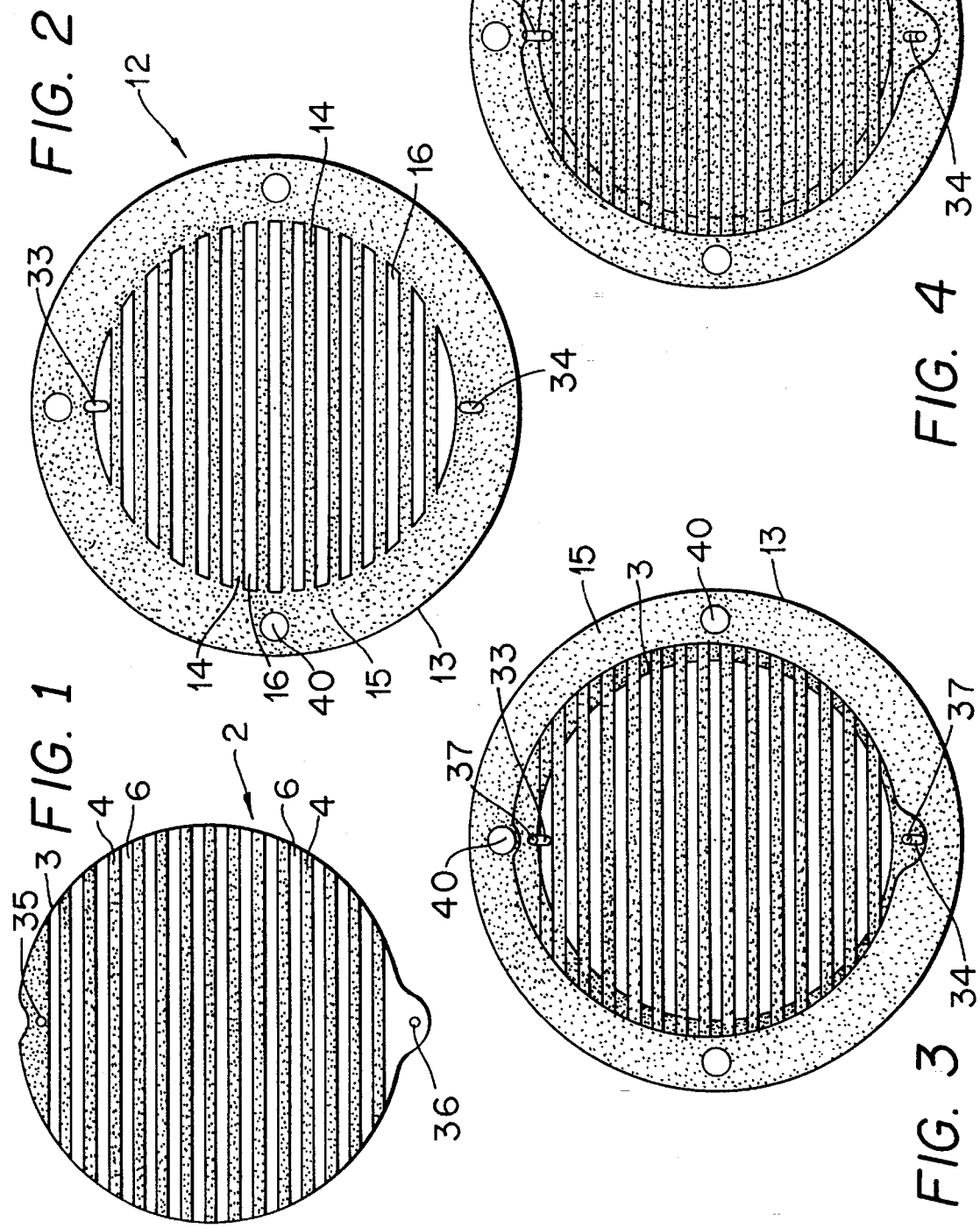

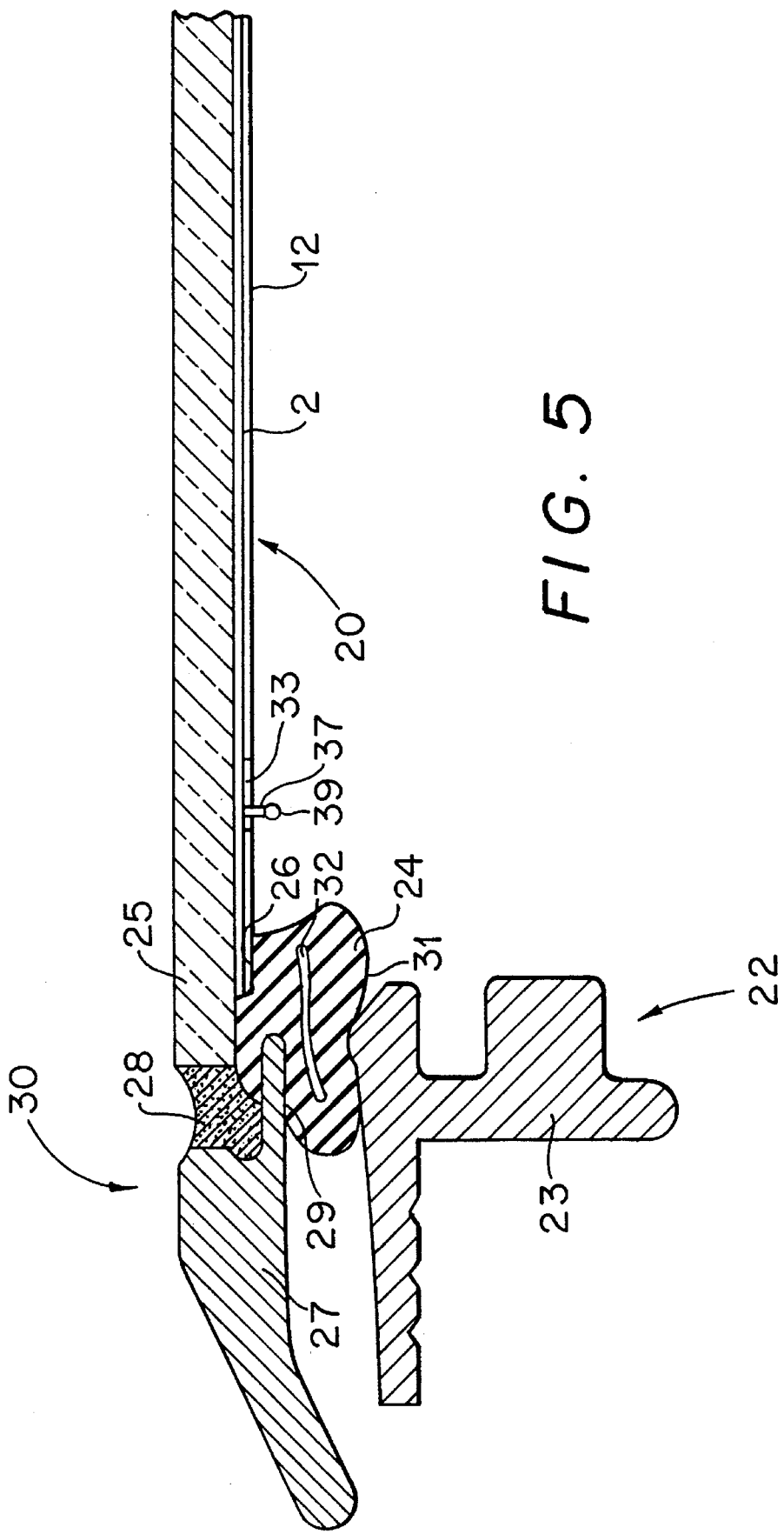

REMOVABLE LIGHT LIMITING BLIND ASSEMBLY

FIELD OF THE INVENTION

This invention relates to a removable light controlling blind assembly for a marine vessel or the like, and more particularly to a sun shade or privacy screen which can be inserted in and removed from a port or hatch assembly.

BACKGROUND FOR THE INVENTION

The marine industry has, for many years, searched for an effective sun shade to provide privacy and to reduce the amount of light passing through the port or hatch and into a vessel's cabin. For example, attempts have been made to fit blinds into screen receivers, i.e. frames, and to use spring loaded window shades. The blinds which fit into screen receivers are relatively cumbersome and require storage room when not in place. The spring loaded blinds are not suitable for round portholes or upscale vessels and may be relatively expensive due to the need for a custom fit. They are also unsuitable for overhead installations such as hatch covers in the top of a cabin. Venetian blinds are also unacceptable for many installations, are relatively cumbersome, expensive and difficult to clean.

Other industries have coped with similar problems. For example, a Brubaker U.S. Pat. No. 2,549,167, discloses a light controlling element for use in a window frame, door frame or the like. The light controlling element disclosed therein includes a pair of separate movable panels which are disposed in laped relation. Each of the panels includes successively arranged strip like areas of transparent and translucent or opaque material. By shifting one of the panels in one direction relative to the other, the transparent portions are brought into position where they are shut off by the translucent or opaque portions.

A more recent Jardin et al., U.S. Pat. No. 5,405,184, discloses a vehicle roof which has a light transmissive cover. The roof also includes a device for varying the light transmissibility of the cover. According to that disclosure, the light transmissibility can be regulated by integrating a device of darkening elements into the transparent cover. These darkening elements are formed by two superposed polarized films that are movable relative to each other so that the light transmissibility of the cover can be steplessly adjusted.

It is now believed that there may be a significant commercial demand for a sunshade or privacy screen which can be inserted and removed from a port or hatch assembly in a marine vessel. It is also believed that this demand would be enhanced if the sun shade or privacy screen is extremely flat, light weight, relatively inexpensive, easy to activate, and at the same time, relatively easy to install, remove and clean.

It is also believed that removable light controlling blind assemblies in accordance with the present invention are particularly applicable for marine vessels such as sailboats and motor yachts. The blind assemblies are particularly applicable for such vessels because they are of simple construction, extremely flat, compact, of light weight construction and present a pleasing appearance.

The blind assemblies in accordance with the present invention are also relatively easy to manufacture, can be readily manufactured to fit different shapes and sizes of port holes and hatches and in various colors to match the colors of a boat or yacht at a relatively low cost. In addition, the blind assemblies may be easily inserted into a hatch or port hole assembly, readily removed for easy cleaning and are relatively compact for storage when removed from the port hole or hatch assembly. Furthermore, the blind assemblies in accordance with a preferred embodiment of the invention, allow some light to enter a cabin on sunlit days and at the same time provide complete visual privacy.

SUMMARY OF THE INVENTION

In essence, the invention contemplates a removable light limiting blind assembly which controls the amount of light which passes through an opening such as a port, hatch or window in a vessel. This port or window in the opening of the vessel may be of glass, plastic or other suitable material. In addition, a resilient gasket means surrounds the opening and sealingly engages the port or window and securely positions the port or window in place within the opening.

The blind assembly also includes a fixed panel having a plurality of light transmitting and light deflecting areas thereon. For example, in a preferred embodiment of the invention, the light transmitting areas comprise a series of parallel transparent strips which are separated by a plurality of translucent or opaque strips. The assembly also includes a movable panel which is superposed on the fixed panel. This movable panel includes a plurality of light transmitting and light deflecting areas.

Means are provided for moving the movable panel within a common plane which is defined by the face of the movable panel, i.e. the plane between the fixed and movable panels. The movable panel is moved in a first direction with respect to the fixed panel to bring the light deflecting areas of the movable panel into registration with the light transmitting areas of the fixed panel to thereby minimize or block out the light which passes through the panels and into the interior of the vessel. In this manner the blind may be fully closed to provide for the privacy of those on board the vessel.

The means for moving the movable panel in a first direction is also effective for moving the panel in an opposite direction. This movement in the opposite direction brings the light deflecting areas of the movable panel into registration with the light deflecting areas of the fixed panel to maximize the amount of light which passes through the panels when the blind assembly is positioned within the opening in the vessel.

Means including the resiliency of the gasket means are provided for removing the blind assembly, i.e. the fixed and movable panels from the opening. For example, in a preferred embodiment of the invention, a groove is formed in the gasket means adjacent to the window for holding the panels against the window. And then, when it is desired to remove the panels from the window area, the gasket means is sufficiently flexible to allow the panels to be pulled out of the groove. In this manner the port or window will be fully open to light.

In a preferred embodiment of the invention, the sun shade or privacy screen comprises a pair of generally circular ultra violet stable light transmitting plastic sheets which are superimposed, one upon the other. A first of the generally circular sheets has a diameter which is greater than that of the second of the generally circular sheets and includes an ultra violet light stable design printed thereon. This first design comprises a band which extends around the periphery or circumference of the first sheet and which has a width or thickness which is greater than one half of the difference between the diameters of the two sheets, so that the band overlaps the outer periphery of the second sheet. Each of the sheets also include a plurality of vertically spaced translucent or opaque horizontal ultra violet stable strips printed thereon. These strips are preferably of the same height or thickness, i.e. taken along a vertical axis and are separated by transmissive strips of an equal height or thickness. Therefore, when the translucent or opaque stripes of one sheet are brought into registry with the transmissive strips of the other sheet the blind is closed. When the translucent strips of one sheet are superimposed on the translucent strips of the other sheet, the blind is in its open position.

The invention will now be described in connection with the accompanying drawings wherein like reference numbers have been used to indicate like parts.

DESCRIPTION OF THE DRAWINGS

FIG. 1 is a plan view of a movable panel for use in a removable light limiting or controlling assembly in accordance with a first embodiment of the invention;

FIG. 2 is a plan view of a fixed panel for use in a removable light limiting blind assembly in accordance with the first embodiment of the invention;

FIG. 3 is a plan view of the removable light limiting blind assembly with the fixed and movable panels superimposed upon one another and shown with the movable panel positioned for maximum light transmission;

FIG. 4 is a plan view of the removable light limiting blind assembly shown in FIG. 3, but with the movable panel positioned for maximum privacy; and FIG. 5 is a cross sectional view which shows a hatch assembly with the removable light limiting blind assembly positioned therein.

DESCRIPTION OF THE PREFERRED EMBODIMENT OF THE INVENTION

A removable light limiting blind assembly for controlling the amount of light which passes through an opening in a vessel, in accordance with a preferred embodiment of the invention, includes a first element, i.e. a generally circular or somewhat elliptical ultraviolet stable plastic movable panel 2. It is also anticipated that the panel may take the form of a generally rectangular shape with rounded corners or other suitable shape. This movable panel 2 is made of a clear polycarbonate, PETG or other suitable material as will be well understood by those skilled in the art. The panel 2 has a thickness of between about 0.020 and 0.030 inches and defines an outer periphery 3. The panel 2 also includes a plurality of light deflecting, translucent or opaque areas 4 and light transmitting areas 6. The light deflecting areas 4 are printed thereon with an ultraviolet (UV) cured UV stable, waterproof ink of the type which is commonly used in the industry. Also in the preferred embodiment of the invention, the light deflecting areas are translucent which will allow some light to pass therethrough, particularly on a sunny day, but which is sufficiently opaque to provide complete visual privacy for those within the cabin. The panel 2 also includes a peripheral edge 3.

The translucent and transmitting or transparent strips 4 and 6 are defined for convenience as horizontal as shown in the drawings. However, the parallel strips 4 and 6 which are preferably in the form of straight lines may be rotated in a port so that they form any angle with respect to the horizontal. These strips may also take other forms such as wavy lines or alternating areas which may be used to block off adjacent transparent areas. Nevertheless, the horizontal reference has been used to clarify that the thickness or height of the strips 4 and 6 are approximately equal refers to the height along a vertical axis and as shown in the drawings.

The blind assembly also includes a fixed generally circular ultraviolet stable plastic panel 12 having an outer periphery 13. The panel 12 includes a plurality of light deflecting and light transmitting areas 14 and 16 thereon. The movable panel 2 is superimposed on the fixed panel 12 and includes means for moving the movable panel 2 within a plane defined thereby and with respect to the fixed panel 12. This movement is preferably in a first linear direction to bring the light deflecting areas 4 of the movable panel 2 into registration with the light transmitting areas 16 of the fixed panel 12 to thereby minimize the amount of light which passes through the panels 2 and 12. The means for moving the movable panel 2 within a plane defined thereby and with respect to the fixed panel 12 is also effective for movement of the panel 2 in an opposite direction to bring the light deflecting areas 4 of the movable panel 2 into registration with the light deflecting areas 14 of the fixed panel 12 to thereby open the blind and allow light to pass through the panels 2 and 12.

The light limiting blind assembly 20 (see FIG. 5) is adapted to fit into a window, hatch or port assembly 30. As shown in FIG. 5, a port or other opening 22 in a vessel is defined by a base extrusion 23 which surrounds the opening 22 in a conventional manner. In addition to extrusion 23, a resilient gasket 24 of rubber or other elastomeric material as will be well understood by persons of ordinary skill in the art, surrounds the opening 22 and sealingly engages a plastic or glass window element 25. The hatch assembly 30 also includes a top extrusion 27 which forms an outer frame around the window element 25 and caulking 28 which forms a seal between the extrusion 27 and the window element 25.

The gasket 24 also includes a groove 26 adjacent to the window element 25. This groove is constructed and arranged to receive the panel 12 therein with the panel 2 sandwiched between the window element 25 and the panel 12. For this reason, the fixed panel 12 may be referred to as the outer panel while the movable panel 2 may be referred to as the inner panel, i.e. between panel 12 and element 25. The gasket 24 also includes a second groove 29 which is parallel to the groove 26 but on the opposite side thereof for engaging the top extrusion 27. In addition, the gasket 24 includes a deformable bulbous compressible portion 31 and a hollow chamber 32 therein which adds to its flexibility and facilitates moving that portion of the gasket 24 so that the panel 12 can be removed from the groove 26.

Referring now to FIG. 2–4, the outer panel 12 includes a pair of parallel slots 33 and 34 shown as vertical axially aligned slots while the inner panel 2 includes a pair of small holes or openings 35 and 36 formed therein. A pair of pins 37 (only one of which is shown in FIG. 5) are fixed in openings 35 and 36 and extend downwardly (FIG. 5) or inwardly and into the slots 33 and 34 for positioning the panel 2 with respect to panel 12. This slot and pin assembly also allow the inner or movable panel 2 to move linearly with respect to panel 12 while preventing lateral movement thereof. In the preferred embodiment of the invention, one of the pins 37 includes a knob or extension 39 which extends through panel 12 for moving panel 2 between an opened and closed position.

It should be recognized that the relative movement and translucent and transparent areas of panels 2 and 12 can be constructed and arranged for rotation or movement if desired, but that the linear movement is presently preferred because of the simplicity of design and graphics.

Referring now to FIG. 3 and 4, the blind assembly is shown with the blind in the open position in FIG. 3 and in the closed position in FIG. 4. As shown therein, the movable or inner panel 2 is under the outer panel 12. Accordingly, the periphery 3 of panel 2 is covered by the band 15. In addition, the outer panel 12 includes three small round openings 40 which are disposed outwardly from the periphery 3 of panel 2. These small openings 40 are provided to accommodate a dog mechanism (not shown) for closing the hatch or port assembly.

In order to remove the blind assembly, the hatch or port is opened. For example, with reference to FIG. 5, the top extrusion is lifted upwardly which rotates the upper portion thereof including window element 25 about a hinge which is not shown. Once in the open position, a portion of the gasket 24 which is relatively soft is pushed outwardly, so that the blind assembly can be readily removed from the groove 26.

The fixed generally circular panel 12 has a diameter which is greater than the diameter of the movable panel 2 and includes an ultraviolet stable translucent or opaque band 15 printed thereon. The band 15 which extends around the periphery 13 of the fixed panel 12 has a width taken along the outer periphery 13 toward the center of panel 12 which is greater than one half of the difference between the diameters of the fixed and movable panels 12 and 2.

While the invention has been described in connection with its preferred embodiment, it should be understood that changes and modifications may be made therein without departing from the scope of the appended claims.

What is claimed is:

1. A removable light limiting blind assembly for controlling the amount of light which passes through an opening in a vessel comprising:

a port or window in the opening in the vessel and resilient gasket means surrounding the opening and sealingly engaging said port or window;

a fixed panel having a plurality of light transmitting and light deflecting areas thereon and a movable panel superposed on said fixed panel and having a plurality of light transmitting and light deflecting areas thereon, means for moving said movable panel within a plane defined thereby and with respect to said fixed panel in a first direction to bring the light deflecting areas of said movable panel into registration with the light transmitting areas of said fixed panel to thereby minimize the amount of light which passes through said panels and for moving said movable panel within a plane defined thereby and with respect to said fixed panel in an opposite direction to bring the light deflecting areas of said movable panel into registration with the light deflecting areas of said fixed panel to thereby maximize the amount of light which passes through said panels;

means including said gasket means for positioning and maintaining said fixed and movable panels within the opening in the vessel and adjacent to said window; and means including the resiliency of said gasket means for removing the fixed and movable panels from said opening.

2. A removable light limiting blind assembly for controlling the amount of light which passes through an opening in a vessel according to claim 1 in which said resilient gasket means surrounding the opening and sealingly engaging said port or window includes a groove adjacent to said port or window for receiving an outer periphery of said panels therein and for holding said panels sandwiched between said gasket means and said port or window.

3. A removable light limiting blind assembly for controlling the amount of light which passes through an opening in a vessel according to claim 2 in which said fixed panel includes a surface with dimensions which are grater than those of said movable panel and includes an outer periphery with a light deflecting coating defining a band therearound, and wherein said band overlaps the edges of said movable panel.

4. A removable light limiting blind assembly for controlling the amount of light which passes through an opening in a vessel comprising:

a port or window in the opening in the vessel and resilient gasket means surrounding the opening and sealingly engaging said port or window;

a generally circular ultraviolet stable plastic fixed panel having an outer periphery and a plurality of light transmitting and light deflecting areas thereon and a generally circular ultraviolet stable plastic movable panel having an outer periphery superimposed on said fixed panel and having a plurality of light transmitting and light deflecting areas thereon, means for moving said movable panel within a plane defined thereby and with respect to said fixed panel in a first direction to bring the light deflecting areas of said movable panel into registration with the light transmitting areas of said fixed panel to thereby minimize the amount of light which passes through said panels and for moving said movable panel within a plane defined thereby and with respect to said fixed panel in an opposite direction to bring the light deflecting areas of said movable panel into registration with the light deflecting areas of said fixed panel to thereby maximize the amount of light which passes through said panels;

said fixed generally circular panel having a diameter which is greater than the diameter of said movable panel and including an ultraviolet stable translucent or opaque band printed thereon which extends around the periphery of said first panel and which has a width taken along the outer periphery toward the center thereof which is greater than one half of the difference between the diameters of said fixed and movable panels;

said gasket means including a groove adjacent to said port or window for receiving an outer periphery of said fixed panel therein with said movable panel sandwiched between said fixed panel and said port or window; and, means including the resiliency of said gasket means for removing the fixed and movable panels from said opening.

5. A removable light limiting blind assembly for controlling the amount of light which passes through an opening in a vessel according to claim 4 which includes a pair of vertical slots in said fixed panel and a pair of pins fixed to said movable panel and extending into said slots for maintaining the position of the movable panel with respect to the fixed panel while allowing linear movement therebetween.

6. A removable light limiting blind assembly for controlling the amount of light which passes through an opening in a vessel according to claim 5 in which said gasket means includes a deformable bulbous portion and a hollow chamber within said portion for increased flexibility for ease in removing said panels from said groove.

\* \* \* \* \*